Oct. 27, 1942.    F. C. CRAWFORD ET AL    2,299,963
PISTON RING
Filed Dec. 24, 1938

INVENTORS
FREDERICK C. CRAWFORD
BY ARCHIE T. COLWELL
Milburn & Milburn ATTORNEYS.

Patented Oct. 27, 1942

2,299,963

UNITED STATES PATENT OFFICE 2,299,963

PISTON RING

Frederick C. Crawford and Archie T. Colwell, Cleveland, Ohio, assignors to Thompson Products, Inc., Cleveland, Ohio Application December 24, 1938, Serial No. 247,702

5 Claims. (Cl. 309—45)

This invention relates to the art of piston rings for internal combustion engines and the like.

As is well known, in an internal combustion engine the piston rings are relied upon to effectively seal the compression chamber so as to prevent the escape of gases therefrom past the piston, and also to prevent the passage of oil past the piston and into the compression chamber. The resulting inefficiency of the engine operation when the piston rings are lacking in these respects is also well known and hence does not require explanation.

The object of our present invention is to devise a combination form of piston ring which will very effectively serve in sealing the compression chamber against the escape of gases and will also so control the excess oil in the cylinder that it will be removed and thus prevented from entering the compression chamber, this two-fold function being performed by the same piston ring assembly in which each part thereof is peculiarly well adapted for its particular purpose.

Other objects will appear from the following description and claims when considered together with the accompanying drawing.

Figure 1:
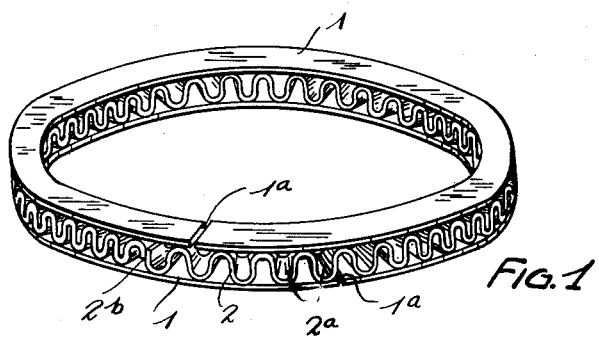
Figure 2:
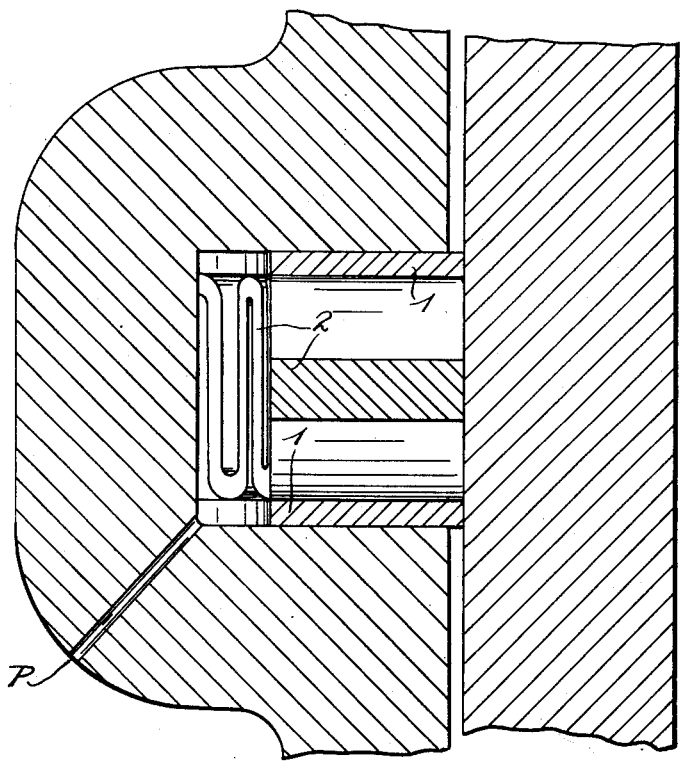

Fig. 1 is a perspective view of one preferred form of our combination piston ring; and Fig. 2 is a sectional view illustrating the assembly of this form of combination piston ring in the groove of a piston.

It is to be understood that the present form of disclosure is merely for the purpose of illustration and that there may be devised various modifications without departing from the spirit of the present invention as herein set forth and claimed.

Our present improved form of piston ring, as herein illustrated, comprises a pair of flat, comparatively thin, split ring members 1 of resilient metal, as for instance steel, cast iron, bronze or other suitable metal, and an intermediate ribbon 2 of steel or bronze or other suitable metal which has been folded back and forth upon itself into what might be regarded as a flexible corrugated form with the radially extending, alternately arranged passages 2a therethrough.

The plain, flat faces of the ring members 1 are adapted to engage against the side walls of the regular piston ring groove, and the intermediate corrugated ring member 2 is adapted to fit between the inner, plain flat faces of the members 1 with a slight clearance between the peaks of the corrugations and the members 1. The outer edges of the thin ring members 1 are very effective in providing positive sealing engagement with the wall of the cylinder so as to prevent escape of the gases from the compression chamber, while the outer edge of the intermediate ring member 2 also engages the wall of the cylinder and serves very effectively to scrape any excess oil from the cylinder wall and to direct the same inwardly through the passages 2a and thence through the regular oil passages P in the body of the piston so that it will return to the crank case.

The thin ring members 1 are radially resilient so as to always have positive sealing engagement with the wall of the cylinder. Likewise, the ring member 2 is radially and circumferentially resilient so as to always have effective engagement with the cylinder wall for the purpose intended. The ring member 2 is cut longer than required to fit the cylinder bore and, when installed, its ends are placed in compression contact with each other, as indicated at 2b; whereby, due to the flexibility and form of the ring member, such compression forces it outwardly against the cylinder wall in a uniform manner throughout the entire extent thereof. The ends of the ring members 1 have abutting arrangement at the joint thereof except for a slight gap, as indicated at 1a. There is ample clearance between the inner peripheries of the ring members 1 and 2 and the bottom of the piston groove to permit their functioning in the manner herein contemplated.

The ring members 1 provide the side walls of the piston groove with a means of effective bearing engagement for the ring member 2 which has comparatively small bearing surface because of its form. Due to the improved bearing surface afforded by the members 1, as compared with the side walls of the piston groove itself, the functioning of the ring member 2 is greatly improved.

Thus, our improved ring combination comprises outer ring members that are especially well adapted to prevent passage of gases, and an intermediate ring member that is especially well adapted to control any excess oil.

In the present form of disclosure, the radially disposed passages 2a are of substantial width, which is desirable in order to lessen the danger of these passages becoming clogged by the formation of carbon. Not only would the clogging of these passages prevent the functioning of the oil-control means, as herein contemplate, but the accumulation of carbon between the folds or corrugations of the ring member 2 would tend to destroy the resilient action and hence the effectiveness of the ring member 2. Thus it is preferred that these passages 2a be of substantial dimensions, although this ring member may be formed with various configurations, and the shape and size of the passages therethrough may vary accordingly, all within the spirit of the present invention.

We have herein shown a form of device in which two flat ring members 1 are employed but it is possible that one of them might be omitted, preferably the lower one; in which event, the intermediate ring member 2 would have direct engagement with the side wall of the piston groove upon the one side thereof.

The primary advantage of our present combination ring resides in the efficient manner in which it seals the compression chamber and also controls the oil, in the manner hereinabove explained; this combined result being produced by the particular forms of the ring members 1 and 2. At the same time, the entire ring assembly is of comparatively light weight and can be manufactured at comparatively low cost.

What we claim is:

1. A piston ring comprising a pair of spaced, parallel, split, radially resilient, thin, flat ring members adapted to have their outer side faces seat against the side walls of the piston groove and to have their outer edges resiliently engage the wall of the cylinder for sealing engagement therewith, the space between said pair of ring members being substantially greater than the thickness of one of said ring members, and a single intermediate oil-control ring member, bent back and forth upon itself into pronounced corrugated form, arranged between and in staggered multiple engagement with the inner faces of said upper and lower ring members at points at substantially close intervals and adapted to have its outer edge in continuous engagement with the wall of the cylinder throughout the entire space between said upper and lower ring members, the corrugated form of said intermediate ring member being such as to divide the entire space between said upper and lower ring members into substantially radially disposed staggered upper and lower passages with their side walls extending primarily in a direction across the space between said upper and lower ring members and each making a substantially abrupt angle therewith, and said intermediate ring member being radially and circumferentially resilient with its ends in compression contact with each other so as to provide uniformly resilient engagement of the outer edge of said intermediate ring member with the wall of the cylinder throughout the entire extent thereof.

2. A piston ring comprising a pair of spaced, parallel split, radially resilient, thin, flat ring members adapted to have their outer side faces seat against the side walls of the piston groove and to have their outer edges resiliently engage the wall of the cylinder for sealing engagement therewith, and a single intermediate oil-control ring member, bent back and forth upon itself into pronounced corrugated form, arranged between and in staggered multiple engagement with the inner faces of said upper and lower ring members at substantially close, spaced intervals and being radially and circumferentially resilient so as to have its outer edge in continuous uniformly resilient engagement with the wall of the cylinder throughout the entire space between said upper and lower ring members, the corrugated form of said intermediate ring member being such as to divide the entire space between said upper and lower ring members into substantially radially disposed staggered upper and lower passages, said passages being free of obstruction so as to facilitate the escape of oil therethrough and the side walls thereof making an abrupt angle with said upper and lower ring members and being spaced from each other throughout and being otherwise free for automatic resilient action thereof.

3. A piston ring including a split, radially resilient, thin, flat ring member adapted to have one face thereof seat against a side wall of the piston groove and to have its outer edge resiliently engage the wall of the cylinder for sealing engagement therewith, and a single companion oil-control ring member, bent back and forth upon itself into pronounced corrugated form, adapted to have multiple point engagement with the inner face of said first-named ring member at substantially close intervals and having its ends in compression contact with each other so as to be radially and circumferentially resilient and to have its outer edge in continuous uniformly resilient engagement with the wall of the cylinder throughout the entire extent thereof, the corrugated form of said oil-ring member being such as to provide substantially radially disposed staggered upper and lower passages, said passages being free of obstruction so as to facilitate the escape of oil therethrough and the side walls thereof making an abrupt angle at the top and bottom thereof and being spaced from each other throughout and being otherwise free for automatic resilient action thereof.

4. A piston ring comprising a pair of spaced, parallel, split, radially resilient, thin, flat ring members adapted to have their outer side faces seat against the side walls of the piston groove and to have their outer edges resiliently engage the wall of the cylinder for sealing engagement therewith, the space between said pair of ring members being substantially greater than the thickness of one of said ring members, and a single intermediate oil-control ring member, bent back and forth upon itself into pronounced corrugated form, arranged between and in staggered multiple engagement with the inner faces of said upper and lower ring members at substantially close intervals, the corrugated form of said intermediate ring member being such as to divide the entire space between said upper and lower ring members into substantially radially disposed staggered upper and lower passages with their side walls extending primarily in a direction across the space between said upper and lower ring members and each making a substantially abrupt angle therewith, and said intermediate ring member having its ends in compression contact with each other so as to be circumferentially resilient for effective engagement with said outer ring members at close intervals throughout the entire extent thereof.

5. A piston ring including a split, radially resilient, thin, flat ring member adapted to have one face thereof seat against the side wall of the piston groove and to have its outer edge resiliently engage the wall of the cylinder for sealing engagement therewith, and a single companion oil-control ring member, bent back and forth upon itself into pronounced corrugated form, adapted to have multiple point engagement with the inner face of said first-named ring member at substantially close intervals and having its ends in compression contact with each other so as to be circumferentially resilient for effective engagement with the said first-named ring member at close intervals throughout the entire extent thereof, the corrugated form of said oil-ring member being such as to provide substantially radially disposed staggered upper and lower passages, said passages being free of obstruction so as to facilitate the escape of oil therethrough and the side walls thereof making an abrupt angle at the top and bottom thereof and being spaced from each other throughout and being otherwise free for automatic resilient action thereof.

FREDERICK C. CRAWFORD.
ARCHIE T. COLWELL.